(12) United States Patent
Tu et al.

(10) Patent No.: US 6,978,161 B2
(45) Date of Patent: Dec. 20, 2005

(54) SELF-RECHARGEABLE PORTABLE TELEPHONE DEVICE WITH ELECTRICITY GENERATED BY MOVEMENTS MADE IN ANY DIRECTION

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 323 days.

(21) Appl. No.: 10/341,475

(22) Filed: Jan. 14, 2003

(65) Prior Publication Data

US 2004/0137961 A1    Jul. 15, 2004

(30) Foreign Application Priority Data

Jan. 10, 2003 (TW) ............................. 92100562 A

(51) Int. Cl.[7] ...................... H04M 1/00; H02K 21/12; H02K 1/22; H02K 17/00
(52) U.S. Cl. ...................... 455/573; 455/572; 455/574; 310/156.32; 310/268; 310/201
(58) Field of Search .................. 455/414.1, 575.1, 455/90.3, 571–574; 310/74, 156.32, 178, 310/201, 268

(56) References Cited

U.S. PATENT DOCUMENTS

| | | | |
|---|---|---|---|
| 3,696,251 A | 10/1972 | Last et al. | |
| 4,114,305 A | 9/1978 | Wohlert et al. | |
| 4,114,932 A | 9/1978 | Freeberg | |
| 4,260,901 A | 4/1981 | Woodbridge | |
| 4,709,176 A | 11/1987 | Ridley et al. | |
| 5,001,685 A | * 3/1991 | Hayakawa | .................. 368/204 |
| 5,347,186 A | 9/1994 | Konotchick | |
| 5,514,923 A | * 5/1996 | Gossler et al. | ................. 310/74 |
| 5,975,714 A | 11/1999 | Vetorino et al. | |
| 5,977,684 A | * 11/1999 | Lin | ............................ 310/268 |
| 6,172,426 B1 | 1/2001 | Galich | |
| 6,183,125 B1 * | 2/2001 | Hara et al. | ................... 368/322 |
| 6,341,217 B1 | 1/2002 | Wong | |
| 6,346,791 B1 * | 2/2002 | Barguirdjian | ............... 320/101 |
| 6,794,783 B2 * | 9/2004 | Tu et al. | ................ 310/156.32 |
| 2004/0204180 A1 * | 10/2004 | Liao | ........................... 455/573 |

* cited by examiner

Primary Examiner—Sonny Trinh
Assistant Examiner—Thai N. Vu
(74) Attorney, Agent, or Firm—Bacon & Thomas, PLLC

(57) ABSTRACT

A self-rechargeable portable telephone device in which electricity is generated by movements made in any direction, includes an eccentric pendulum transmission device which causes rotation of an output shaft in response to movement of the telephone body. The output shaft is connected to and causes rotation of the shaft of a flat rotary electric generator. The flat rotary generator includes at least one disc-shaped magnetic pole structure and at least one toroidal coil structure arranged such that the toroidal coil structure cuts magnetic lines generated by the disc-shaped magnetic pole structure to generate electric energy, when the shaft is rotated. The generated energy is accumulated by the energy storage element of an energy storage circuitry system and released when the accumulated electrical energy in the energy storage element exceeds a predetermined voltage to charge a rechargeable battery for the portable telephone.

7 Claims, 5 Drawing Sheets

SELF-RECHARGEABLE PORTABLE TELEPHONE DEVICE WITH ELECTRICITY GENERATED BY MOVEMENTS MADE IN ANY DIRECTION

BACKGROUND OF THE INVENTION

1. Field of the Invention

The invention relates to a self-rechargeable portable telephone device in which electricity for charging at least one battery is generated by movements made in any direction, and more particularly to a self-rechargeable portable telephone device having a power generation device capable of converting mechanical energy into electric energy by using an eccentric pendulum transmission device, and storing the electric energy in a battery cell.

This application incorporates by reference the applications entitled "Energy Storage Circuitry System" and "Flat Rotary Electric Generator" filed on the same day as the present application, by the same inventors and assignee as the present application.

2. Description of the Related Art

Typically, the portable telephone used for wired or wireless communication employs a primary cell or secondary cell. The conventional primary cell is a non-rechargeable, disposal cell and the conventional secondary cell may be an Ni—H cell, Li cell, and electrolytic cell, etc.

However, all of the above cells need to be replaced or recharged and are inconvenient to use. Therefore, it is necessary to develop a telephone which is capable of self-recharging a rechargeable cell.

SUMMARY OF THE INVENTION

Therefore, an object of the present invention is to provide a self-rechargeable portable telephone device with electricity generated by movements made in any direction, having a power generation device of converting kinetic energy into electric energy by using an eccentric pendulum transmission device. The eccentric pendulum transmission device transmits force to an output shaft, which is connected to and rotates a shaft of a flat rotary electric generator. The generator shaft drives at least one disc-shaped magnetic pole structure or at least one toroidal coil structure to cause the toroidal coil structure to cut magnetic lines and generate electric energy. The generated energy is stored in an energy storage element and then the stored energy is released by control of a comparison circuit to charge a rechargeable battery for the portable telephone so as to achieve the object of self-recharge.

In order to achieve the above object, according to an aspect of the invention, there is provided with a self-rechargeable portable telephone that includes a portable telephone body including circuitry for receiving and transmitting data or voice signals, an eccentric pendulum transmission device for transmitting forces resulting from movement of the telephone body to an output shaft arranged to drive a rotating shaft; and a flat rotary electric generator. Preferably, the generator includes at least toroidal coil structure for cutting magnetic lines to induce a current, and at least one disc-shaped magnetic pole structure oriented parallel to the toroidal coil structure and located on the side of the toroidal coil structure. The toroidal coil structure and the disc-shaped magnetic pole structure are not provided with a permeable material, so that magnetic lines produced by the at least one disc-shaped magnetic pole structure are cut by the at least one toroidal coil structure, when the rotating shaft is rotated by the output shaft to generate an induced current. The self-rechargeable portable telephone also preferably includes an energy storage circuitry system, having an energy storage element, a voltage boosting circuit for boosting input of power to the energy storage element based on a feedback voltage from the energy storage element; a comparison circuit for comparing the voltage in the energy storage element with a reference voltage to detect if the voltage in the energy storage element has achieved a predetermined value and for generating a control signal, and a charging circuit for charging a rechargeable battery in response to the control signal when the voltage in the energy storage element is detected to achieve the predetermined value. Finally, the self-rechargeable telephone includes a rechargeable battery, charged by the stored voltage in the energy storage element; and at least one protection circuit for protecting the telephone body and the rechargeable battery.

DETAILED DESCRIPTION OF THE INVENTION

Figure 1:
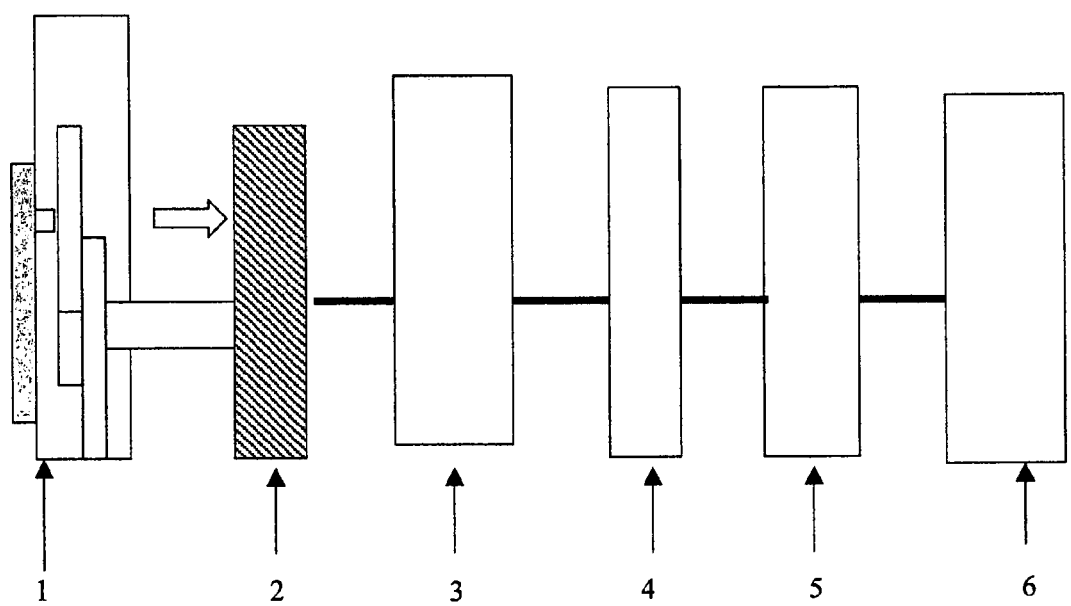
FIG. 1 is a block diagram, showing a structure of a preferred embodiment of a self-rechargeable portable telephone device with electricity generated by movements made in any direction according to the invention.

The following description will illustrate a preferred embodiment of the invention in accordance with the drawings. FIG. 1 is a block diagram showing a structure of an embodiment of a self-rechargeable portable telephone, in which electricity is generated by movements made in any direction, and which includes an eccentric pendulum transmission device 1, a flat rotary electric generator 2, an energy storage circuitry system 3, a protection circuit 4, a battery 5, and a portable telephone body 6.

Figure 2:
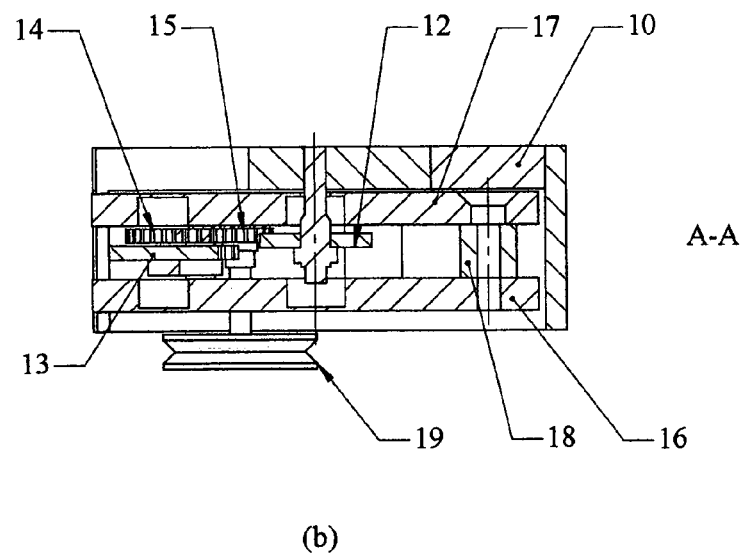
FIGS. 2(a) to 2(c) are perspective views, showing an eccentric pendulum transmission device of the invention.
Figure 2:
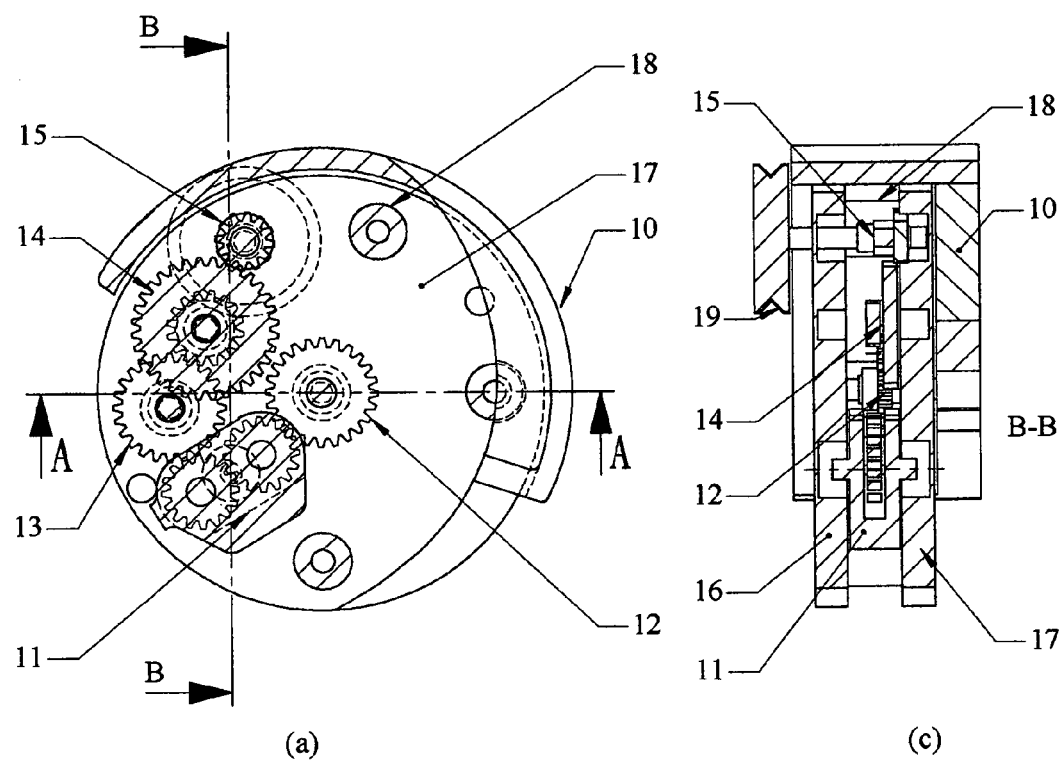

As shown in FIG. 2, wherein FIG. 2(a) is a section view, and FIGS. 2(b) and 2(c) are section views along lines A—A and B—B of FIG. 2(a). The eccentric pendulum transmission device 1 includes an eccentric pendulum 10, which can be swung by external force such as vibration force, swing force, gravity, or any other force that causes movement of the telephone body 6 in any direction, and which can drive a unidirectional switching device 11 by using a gear 12 such that the gear assembly formed by gears 13, 14, 15 rotates in a single direction for rotating pulley 19. An output shaft of the pulley 19 drives a rotating shaft of a flat rotary electric generator by means of a belt (not shown) and second pulley 23 on the shaft of the generator. It will be appreciated that the belt and pulley may be replaced by any suitable transmission structure.

Figure 3A:
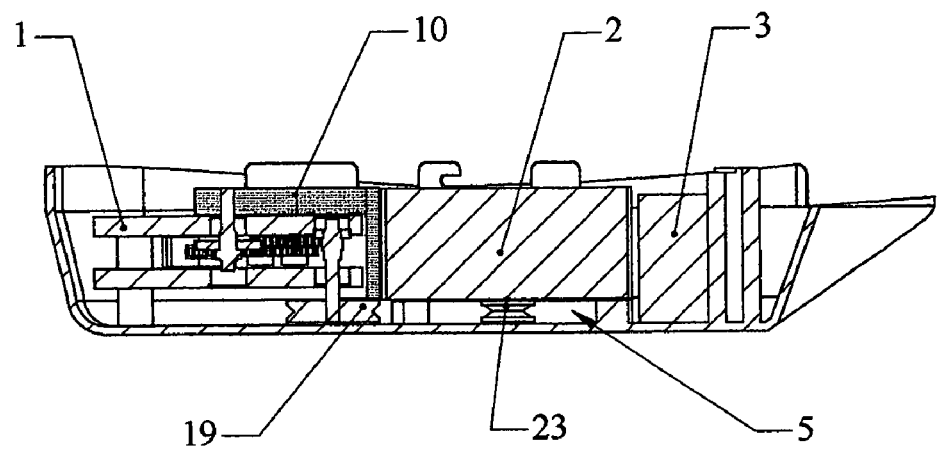
FIGS. 3(a) and 3(b) are perspective views, showing the structural drawing of the embodiment.
Figure 3B:
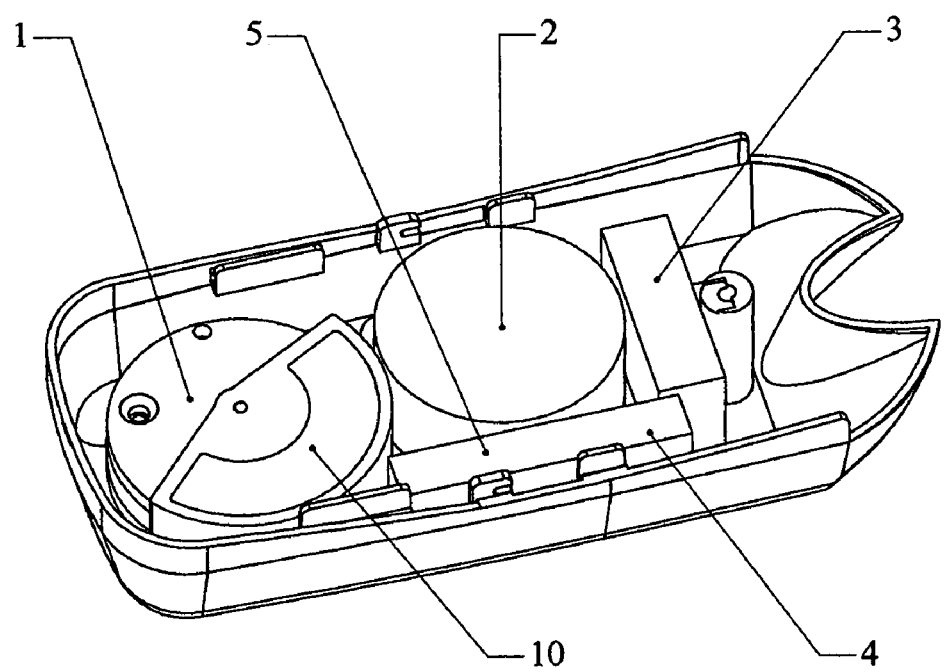

FIGS. 3(a) and 3(b) show a planar view and section view of the structure of FIG. 1, in which the transmission device 1, flat rotary generator 2, energy storage circuitry system 3, protection circuit 4, and battery 5, are provided in a portable telephone device body 6.

Figure 4A:
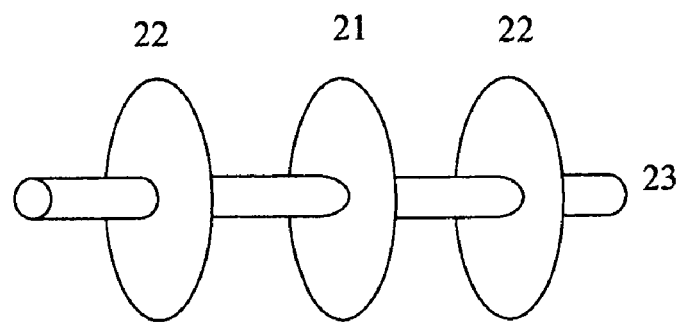
FIGS. 4(a) to 4(c) are schematic drawing, showing a structure of a flat rotary electric generator of the invention.
Figure 4B:
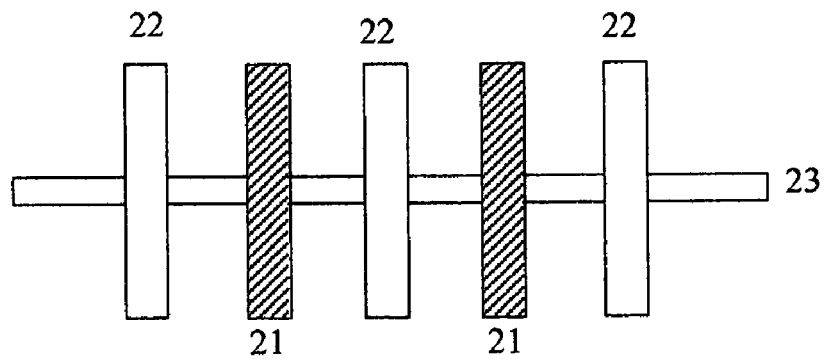
Figure 4C:
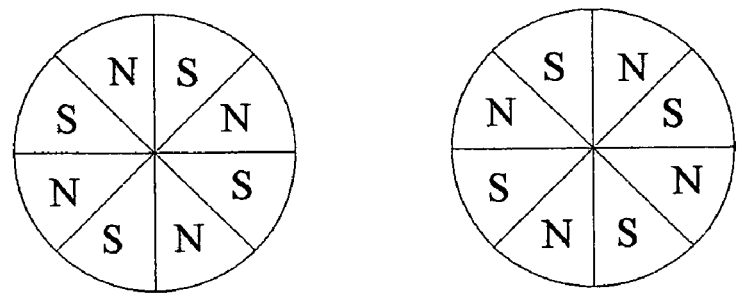

FIGS. 4(a), 4(b) and 4(c) show the structure of rotary electric generator 2. The flat rotary electric generator 2 uses magnetic lines to induce a current. The generator includes at least one disc-shaped magnetic pole structure 22 and at least one toroidal coil structure 21 oriented in parallel with, and located on the side of the disc-shaped magnetic pole structure 22. The toroidal coil structure 21 and disc-shaped magnetic pole structure 22 are not provided with permeable materials, so that magnetic lines produced by the at least one disc-shaped magnetic pole structure 22 will pass through the at least one toroidal coil structure 21. When the rotating shaft 23 of the disc-shaped magnetic pole structure 22 is rotated by the belt connected to the pulley 19 of the transmission device 1. The toroidal coil structure 21 cuts the magnetic lines passing therethrough to generate an induced current. The induced current is input to the energy storage circuitry system 3. Optionally, multiple toroidal coil structures 21 and disc-shaped magnetic pole structures 22 can be arranged in alternating and parallel manner, as shown in FIG. 4(b). Also optionally, the disc-shaped magnetic pole structures 22 includes at least two magnetic poles arranged in sections bounded by radii of the disc-shape, as shown in FIG. 4(c).

Figure 5:
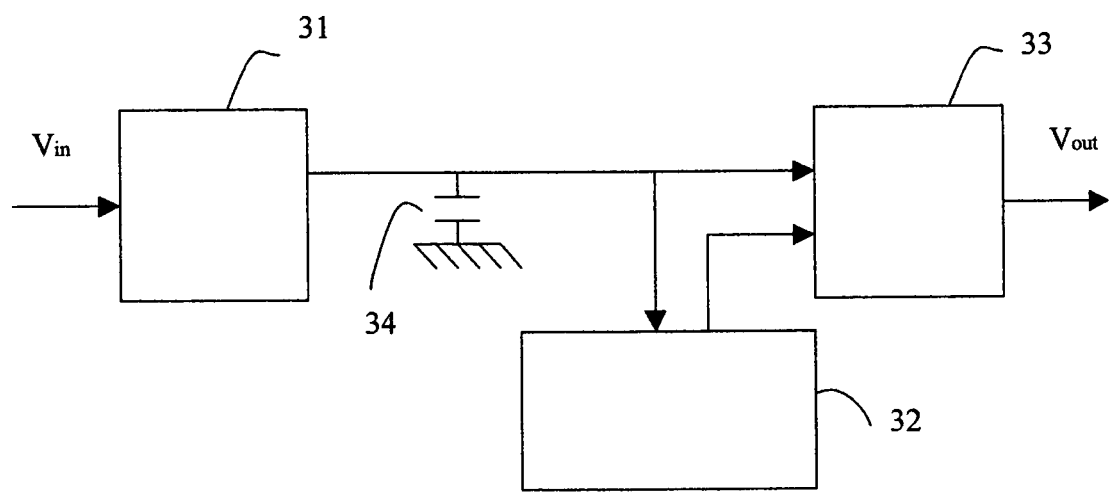
FIG. 5 is a block diagram, showing a structure of an energy storage circuit of the invention.

FIG. 5 shows the structure of energy storage circuitry system 3. The energy storage circuitry system 3 has an energy storage element 34 and a voltage boosting circuitry system 31 that is used for regulating supply of power to the energy storage element based on feedback storage element. A comparison circuit 32 is provided for comparing the voltage in the energy storage element 34 with a reference voltage to detect if the voltage in the energy storage element 34 has achieved a predetermined value and for generating a control signal. In addition, a charging circuit 33 is provided for charging the rechargeable battery 5 in response to the control signal. The rechargeable battery 5 is charged by the stored voltage in the energy storage element 34. At least one protection circuit is provided for protection of the telephone body 6 and the rechargeable battery 5.

Optionally, a connector may be provided to permit recharging of the battery through an external power source such as a recharger in addition to the self-recharging described above. In that case, another one protection circuit may include a rectifier to permit it to be used for charging.

Having described the preferred embodiment of the invention, it will be appreciated that the details of the preferred embodiment are not intended to limit of the invention, Instead, that modifications and variations can be made by persons skilled in the art in light of the above teachings. It is therefore to be understood that various changes, equivalences and modifications may be made in the particular example of the invention without departing from the scope and spirit of the invention as outlined by the appended claims.

What is claimed is:

1. A self-rechargeable portable telephone, comprising: a portable telephone body including telephone circuitry; an eccentric pendulum transmission device for converting movement of the telephone body into rotation of an output shaft; a flat rotary generator including at least one toroidal coil structure and at least one disc-shaped magnetic pole structure having a plurality of poles of opposite polarity, said at least one disc-shaped magnetic pole structure being oriented parallel to the at least one toroidal coil and located on one side thereof, said flat rotary generator further including a shaft that is rotated in response to rotation of the eccentric pendulum transmission device output shaft to cause relative rotation between the toroidal coil structure and the disc-shaped magnetic pole structure and induce a current in the toroidal coil structure; and a rechargeable battery charged by the induced current.

2. The self-rechargeable portable telephone according to claim 1, wherein the eccentric pendulum transmission device includes an eccentric pendulum arranged to be swung by an external force in any direction and for driving a gear assembly to generate the transmission force on the output shaft in order to drive the rotating shaft of the flat rotary electric generator.

3. The self-rechargeable portable telephone according to claim 1, wherein the toroidal coil structure and the disc-shaped magnetic pole structure are not provided with a permeable coil structure.

4. The self-rechargeable portable telephone according to claim 1, further comprising an energy storage circuitry system for accumulating electrical power supplied by the flat rotary generator and releasing the power to charge the battery when an accumulated voltage level reaches a predetermined voltage level.

5. The self-rechargeable portable telephone according to claim 4, wherein the energy storage circuitry system includes an energy storage element and a voltage boosting circuit for regulating supply of power to the energy storage element used on feedback from the energy storage element.

6. The self-rechargeable portable telephone according to claim 4, wherein the energy storage circuitry system includes an energy storage element; a comparison circuit for comparing a voltage level of the energy storage element with a predetermined voltage level and for generating a control signal; and a charging circuit for releasing charging power from the energy storage element to the rechargeable battery in response to said control signal.

7. The self-rechargeable portable telephone according to claim 1, further comprising at least one protection circuit for protecting the telephone body and the rechargeable battery.

* * * * *